United States Patent [19]
Sanocki et al.

[11] Patent Number: 5,955,177
[45] Date of Patent: Sep. 21, 1999

[54] FIRE BARRIER MAT

[75] Inventors: Stephen M. Sanocki, Stillwater; John L. Erickson, White Bear Lake, both of Minn.

[73] Assignee: 3M Innovative Properties Company, St. Paul, Minn.

[21] Appl. No.: 08/708,274

[22] Filed: Sep. 3, 1996

[51] Int. Cl.$^6$ ................................ B32B 27/14; B05D 5/00
[52] U.S. Cl. .................... 428/210; 428/219; 442/136; 442/172; 442/178; 442/179; 442/180; 427/282; 427/288
[58] Field of Search ..................................... 428/198, 210, 428/219; 442/136, 172, 178, 179, 180; 427/282, 288

[56] References Cited

U.S. PATENT DOCUMENTS

| | | | |
|---|---|---|---|
| 3,009,822 | 11/1961 | Drelich et al. | 117/38 |
| 3,795,524 | 3/1974 | Sowman | 106/65 |
| 3,996,145 | 12/1976 | Hepburn | 252/62 |
| 4,047,965 | 9/1977 | Karst et al. | 106/65 |
| 4,396,661 | 8/1983 | George et al. | |
| 4,428,999 | 1/1984 | George et al. | |
| 4,600,634 | 7/1986 | Langer | |
| 4,761,323 | 8/1988 | Mühiratzer et al. | 428/196 |
| 4,828,774 | 5/1989 | Andersson et al. | 264/60 |
| 4,954,462 | 9/1990 | Wood et al. | 501/95 |
| 5,014,396 | 5/1991 | Nieminen | 19/205 |
| 5,021,369 | 6/1991 | Ackerman et al. | 501/95 |
| 5,078,818 | 1/1992 | Hen et al. | 156/89 |
| 5,290,522 | 3/1994 | Rogers et al. | 422/179 |
| 5,308,692 | 5/1994 | Kennedy et al. | 428/290 |
| 5,344,681 | 9/1994 | Calhoun et al. | |
| 5,380,580 | 1/1995 | Rogers et al. | 428/219 |
| 5,380,581 | 1/1995 | Mattesky | 428/195 |
| 5,441,682 | 8/1995 | Baker et al. | 264/82 |
| 5,462,642 | 10/1995 | Kajander | 162/116 |

FOREIGN PATENT DOCUMENTS

1 528 354  10/1978  United Kingdom .

*Primary Examiner*—Christopher Raimund
*Attorney, Agent, or Firm*—Gregory D. Allen

[57] ABSTRACT

A flexible mat is provided having a nonwoven fabric having first and second major surfaces; and a coating of metal oxide on only a portion of at least one of the major surfaces.

35 Claims, 2 Drawing Sheets

FIRE BARRIER MAT

BACKGROUND OF THE INVENTION

1. Field of the Invention

The present invention relates to a flexible mat comprising inorganic fibers useful as a fire barrier material.

2. Description of Related Art

Ceramic fibers are typically heat resistant and maintain dimensional stability even at high temperatures (e.g., 500° C. and above). Such fibers are useful, for example, for flame and fire resistant applications such as furnace blankets and gaskets, heat shields, and fire walls. Although woven fabrics of ceramic fibers are known, their area weights, which typically range from about 220 grams/meter$^2$ to about 1000 grams/meter$^2$, make them undesirably heavy for many flame and fire resistant applications.

Nonwoven fabrics of ceramic fibers are also known; however, because ceramic fibers are typically brittle, it is generally difficult to produce such nonwoven fabric constructions with sufficient integrity to withstand normal handling (including that associated with installation). Bonding the fibers together at their points of intersection helps overcome this problem. Bonding methods include sol-gel impregnation, chemical vapor deposition, thermal treatment, stitchbonding, needle punching, or using a scrim to hold the fibers in place. Although such bonding methods can provide nonwoven fabrics useful, for example, in filtration applications, as catalytic converter mounting mats, and as thermal and acoustic insulation, the fabrics are typically relatively heavy, as compared to light weight nonwoven fabrics that include polymer or cellulose-derived materials. Such fabrics are used, for example, as surgical dressings, napkins, diapers, and clothing. Although these fabrics are lighter weight and typically more flexible, they usually do not have the flame and fire resistant characteristics necessary for use in fire barrier mats.

Therefore, a challenge remains to provide a flexible nonwoven mat having good flame barrier characteristics that is light in weight, strong, flexible, and preferably retains its integrity after exposure to high temperatures.

SUMMARY OF THE INVENTION

The present invention provides a flexible mat comprising:
(a) a nonwoven fabric having first and second major surfaces; and
(b) a metal oxide coating on only a portion of at least one of the major surfaces;
wherein:
(i) the fabric includes an amount of inorganic fibers at least about 5 millimeters in length, and
(ii) the mat includes an amount and arrangement of the metal oxide coating,
both of which are sufficient to retain the integrity of the mat when it is wrapped once around a 6 millimeter diameter rod and then unwrapped.

The present invention also provides a flexible mat comprising:
(a) a nonwoven fabric having an organic binder therein, and first and second major surfaces; and
(b) a metal oxide coating on only a portion of at least one of the major surfaces;
wherein:
(i) the fabric includes an amount of inorganic fibers at least about 5 millimeters in length, and
(ii) the mat includes an amount and arrangement of the metal oxide coating,
both of which are sufficient to retain the integrity of the mat when it is wrapped once around a 6 millimeter diameter rod and then unwrapped.

Another embodiment of the present invention is a flexible mat comprising:
(a) a nonwoven fabric comprising inorganic fibers and having first and second major surfaces, wherein at least about 10% by weight of the inorganic fibers are at least about 5 millimeters in length; and
(b) a metal oxide coating on at least one of the major surfaces, the coating covering about 5% to about 25% of the total surface area of the major surface having the metal oxide coating thereon;
wherein the mat retains its integrity when it is wrapped once around a 6 millimeter diameter rod and then unwrapped.

Also provided is a method of making a flexible mat, the method comprising:
(a) providing a nonwoven fabric having first and second major surfaces; and
(b) depositing a metal oxide source on the nonwoven fabric to provide a metal oxide coating on only a portion of at least one of the major surfaces;
wherein:
(i) the fabric includes an amount of inorganic fibers at least about 5 millimeters in length, and
(ii) the mat includes an amount and arrangement of the metal oxide coating,
both of which are sufficient to retain the integrity of the mat when it is wrapped once around a 6 millimeter diameter rod and then unwrapped.

In this application:

"mat" refers to a sheet-like material of a nonwoven fabric having a metal oxide coating thereon;

"flexible" refers to a mat which, (before, and preferably, after heat treatment at 500° C. for 10 minutes), can be wrapped around a 6 millimeter diameter rod once and then unwrapped without significantly destroying the integrity of the mat (i.e., cracks may appear and some individual fibers may break, but the mat does not fall apart, split apart, or disintegrate into smaller portions or individual fibers);

"fiber" refers to a filament structure having a length of at least about 100 times its diameter;

"glass" refers to an amorphous metal oxide;

"ceramic oxide" refers to a metal oxide which may be crystalline or crystalline and amorphous;

"metal oxide source" refers to dispersions or suspensions of finely divided metal oxide particles (preferably, colloidal metal oxide particles), which may include soluble metal oxides, and/or solutions of metal oxide precursors (i.e., a metal salt or complex which, upon heat treatment, forms an oxide), as well as metal oxide particles without a liquid medium;

"metal oxide coating" refers to material containing at least some metal oxide, whether deposited from colloidal metal oxide dispersions and/or solutions of metal oxide precursors or deposited without use of a liquid medium; and "islands" refer to discrete regions of coating on a surface of the nonwoven fabric which are surrounded by a region substantially free of coating.

DETAILED DESCRIPTION OF THE INVENTION

The present invention provides a flexible mat of a nonwoven fabric having first and second major surfaces, and a coating of metal oxide on only a portion of at least one of the major surfaces. The fabric includes an amount of inorganic fibers of at least about 5 millimeters in length, and the mat an amount and arrangement of metal oxide coating, both of which (the amount of inorganic fibers of at least about 5 millimeters in length, and the amount/arrangement of metal oxide coating) are sufficient to retain the integrity of the mat when it is wrapped once around a 6 millimeter diameter rod and then unwrapped. That is, after being subjected to this flexibility test, although cracks may appear and some individual fibers may break, the mat does not fall apart, split apart, or disintegrate into smaller portions or individual fibers. Preferably, this is true even after the mat has been exposed to a temperature of 500° C. for 10 minutes and then cooled to 25° C.

Particularly preferred embodiments of the flexible mat according to the present invention are capable of supporting a 50-gram weight when exposed to a Bunsen burner flame (a mixture of natural gas and air typically having a temperature of about 800–1200° C.) for 30 seconds. That is, particularly preferred embodiments of the flexible mat according to the present invention are those that pass the Flame Test described below.

The metal oxide coating is positioned on only a portion of at least one surface of the fabric, producing an arrangement of discrete coated regions (also referred to herein as "printed regions"). This arrangement of the regions of metal oxide coating can be regular or random. Typically, the metal oxide coating is deposited on the fabric in a predetermined pattern using, for example, screen printing techniques and a metal oxide source (preferably, a colloidal metal oxide source).

Figure 1:
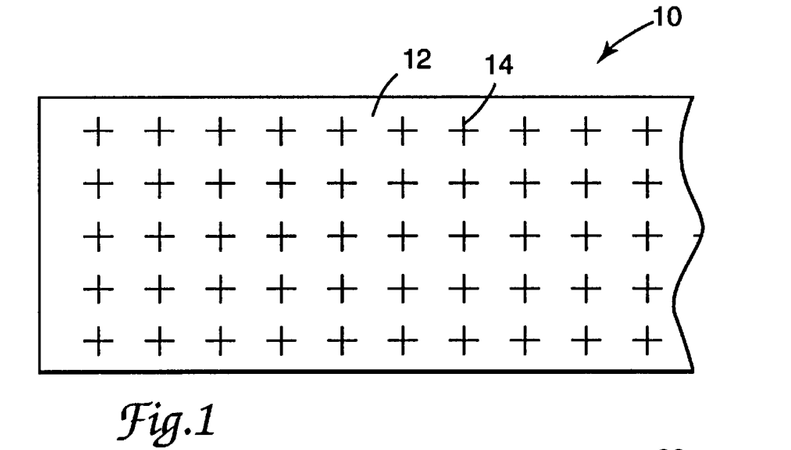
FIGS. 1 through 6 show various top views of portions of flexible mats according to the present invention.
Figure 2:
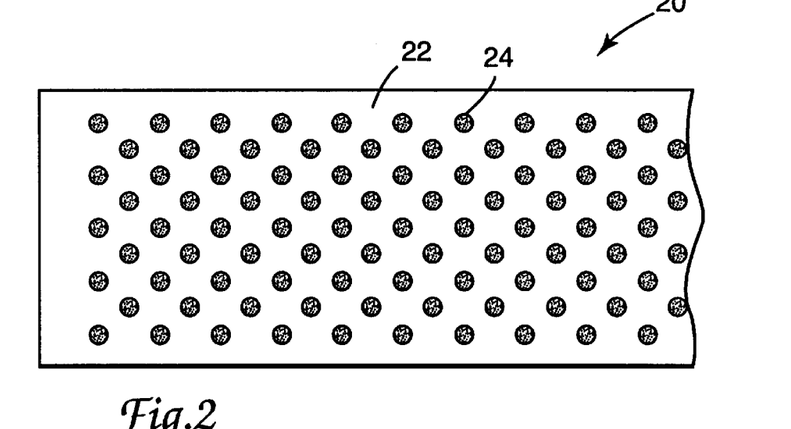
Figure 3:
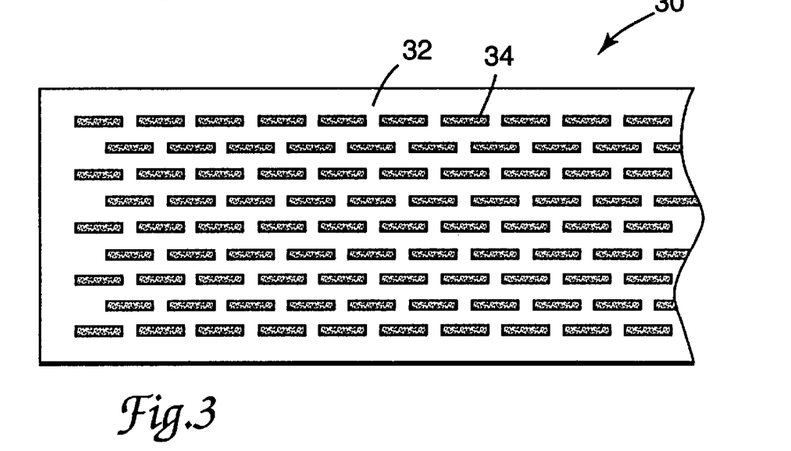

FIGS. 1–3 illustrate portions of mats according to the present invention (10, 20, and 30, respectively) having repeating patterns of discrete regions of a metal oxide coating (14, 24, and 34, respectively) surrounded by regions with substantially no coating (12, 22, and 32, respectively), thereby producing islands in the forms of crosses (14), dots (24), and bars (34), respectively, on at least one major surface of the fabric. These patterns result, for example, from discontinuous coatings of metal oxide.

Figure 4:
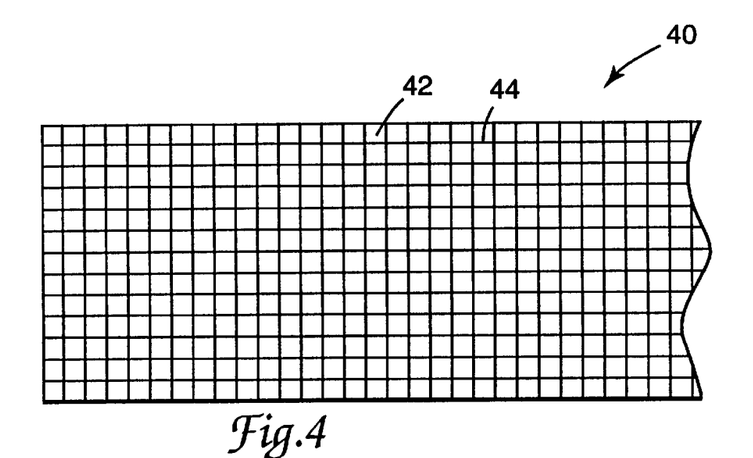
Figure 5:
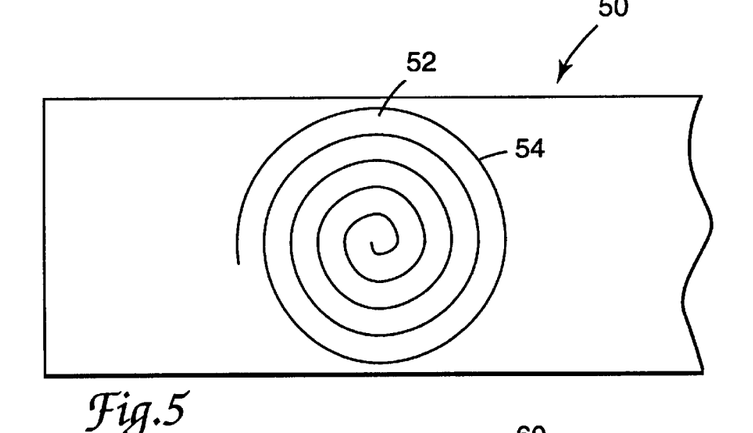
Figure 6:
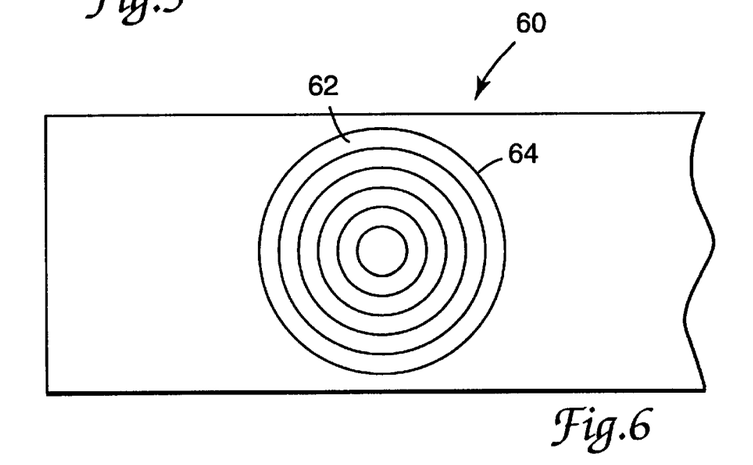

FIGS. 4–6 illustrate portions of mats according to the present invention (40, 50, and 60, respectively) having patterns of generally continuous lines (44, 54, and 64, respectively) of printing in which there are regions of a metal oxide coating next to regions of substantially no coating (42, 52, and 62, respectively), on at least one major surface of the fabric. Although these patterns result, for example, from continuous coatings of metal oxide, they are still in discrete regions and coat only a portion of the surface of the fabric.

The coating patterns illustrated in FIGS. 1–6 are to be contrasted with coatings on the entire surface of a nonwoven fabric. Coating the entire surface of a fabric typically makes the the resultant mat undesirably inflexible, particularly if they have been heat treated. This leads to cracking and breaking of the mat when it is handled, particularly when it must be installed into, for example, a nonplanar space.

Preferably, the number, size, and position of the regions of metal oxide coating are sufficient to retain the desired integrity and flexibility of the mat for its intended use, but at least to pass the Flexibility Test prior to heat treatment. Typically, the regions of metal oxide coating are spaced apart such that the distance between any two regions (e.g., any two islands) is approximately equal to the length of at least some of the fibers in the nonwoven fabric. Preferably, for any one surface having metal oxide coating thereon, the percentage of surface area of that particular surface of the mat that is coated with a metal oxide is in a range of about 5% to bout 25%, and more preferably, about 10% to about 20%. Typically, for fabric samples of about 20 centimeters square, a coating weight of a colloidal metal oxide of at least about 0.5 gram is used.

Preferably, the nonwoven fabric has a sufficient amount of fibers at least about 5 millimeters in length to retain the desired integrity and flexibility of the mat for its intended use, but at least to pass the Flexibility Test prior to heat treatment. Typically, the nonwoven fabric has a sufficient amount of fibers that are long enough to bridge the space between coated regions (i.e., the printed portions of the mat). Thus, preferably, at least about 10% by weight of the inorganic fiber content of the nonwoven fabric (i.e., 10% based on the total inorganic fiber weight) is composed of fibers having a length of at least about 5 millimeters (preferably, at least about 1 centimeter). More preferably, at least about 25% by weight of the inorganic fiber content of the nonwoven fabric is composed of fibers having a length (s) of at least about 5 millimeters (preferably, at least about 1 centimeter). If desired, 100% of the inorganic fiber content of the nonwoven fabric can be fibers having a length(s) of at least about 5 millimeters (preferably, at least about 1 centimeter). It is understood that the fibers can be all one length, although they are typically of a variety of lengths. There is no known limit to the length of the fibers, although typically fibers longer than about 10–15 centimeters are not practical in a nonwoven construction. Furthermore, as long as there are a sufficient number of fibers of at least about 5 millimeters long, the nonwoven fabric can also include shorter fibers of about 1 millimeter (and even particles of about 10-micrometer particle size).

Suitable inorganic fibers are those that are resistant to (i.e., dimensionally stable at) high temperatures (e.g., temperatures of at least about 500° C.). Such fibers include, for example, glass, ceramic oxide (including quartz), silicon nitride, silicon carbide, carbon, and metal. They are typically provided as individual fibers or as bundled fibers, varying in length from a few centimeters to several meters. Preferably, the fabric includes glass fibers, ceramic oxide fibers, or combinations of these fibers. More preferably, the fabric includes primarily ceramic oxide fibers, which typically have both crystalline and glass phases.

Ceramic oxide materials are typically metal oxides that have been consolidated by the action of heat. Ceramic oxide fibers (i.e., ceramic metal oxide fibers) generally refer to a class of fibers typically containing one or more oxides of aluminum, silicon, and boron. Many other additives may also be present (e.g., oxides of sodium, calcium, magnesium, and phosphorus) within the fibers, although the fibers include primarily metal oxides. Typically, the ceramic oxide fibers are crystalline ceramics and/or a mixture of crystalline ceramic and glass (i.e., a fiber contains both crystalline ceramic and glass phases).

Ceramic oxide fibers are commercially available in relatively short fibers typically referred to as "refractory ceramic fibers" (RCF). They are generally weak, friable, and not typically suitable for use in textiles. They can also include particulate material (i.e., shot). Therefore, nonwoven fabrics containing 100% RCF are typically not suitable for making the mats according to the present invention. Such fibers are formed from a melt using a melt-blown method or a meltspinning fiber forming method and subsequently cooled. In standard fiber forming methods, molten material of the desired composition is extruded resulting in fibers of relatively nonuniform length (e.g., varying from about 1 micrometer to about 10 centimeters) of a relatively nonuniform diameter (e.g., about 1 micrometer to about 50 micrometers). Typically, refractory ceramic fibers are provided by the manufacturer in a "staple" form (i.e., as a mass of loose fibers). Examples of refractory ceramic fibers include aluminosilicate fibers available under the trade designation "7000M" from Unifrax of Niagara Falls, N.Y., and "SNSC" Type 1260 D1 RCF from Nippon Steel Chemical Co. of Tokyo, Japan.

Ceramic oxide fibers are also commercially available as relatively long (e.g., continuous) fibers typically grouped together in the form of yarns (twisted fibers) or tows (nontwisted fibers). Such ceramic oxide yarns or tows typically include about 400 to about 7800 individual ceramic oxide fibers. They generally have a diameter of about 0.2 millimeter to about 1.5 millimeters. Yarn diameters in this range can be woven into fabrics and typically have superior textile qualities, particularly as compared to the shorter refractory ceramic fibers. Ceramic oxide yarn can be plytwisted, which means that two or more yarns are twisted together. This typically is done to increase the strength of the yarn. Examples of such continuous fibers include aluminosilicate fibers, aluminoborosilicate fibers, and alumina fibers (all of which are available under the trade designation "NEXTEL" from the 3M Company of St. Paul, Minn.).

Fiber tows or yarns can be chopped using a glass roving cutter, such as, for example, that commercially available under the trade designation "MODEL 90 GLASS ROVING CUTTER" from Finn & Fram, Inc. of Pacoima, Calif., or with a scissors, to the desired length. The chopped fibers can then be separated or individualized by passing them through a waste pulling machine, which is commercially available under the trade designation "CADETTE 500" from LaRoche of Cours, France.

Preferred ceramic oxide fibers are aluminosilicate, aluminoborosilicate, and alumina fibers, whether they be in the form of yarns or in the form of staple fibers. Suitable aluminosilicate fibers are described, for example, in U.S. Pat. No. 4,047,965 (Karst et al.), the disclosure of which is incorporated herein by reference. Preferably, the aluminosilicate fibers include, on a theoretical oxide basis, about 67% to about 85% by weight $Al_2O_3$ and about 33% to about 15% by weight $SiO_2$, based on the total weight of the aluminosilicate fibers. Some preferred aluminosilicate fibers include, on a theoretical oxide basis, about 67% to about 77% by weight $Al_2O_3$ and about 33% to about 23% by weight $SiO_2$, based on the total weight of the aluminosilicate fibers. One preferred aluminosilicate fiber includes, on a theoretical oxide basis, about 85% by weight $Al_2O_3$ and about 15% by weight $SiO_2$, based on the total weight of the aluminosilicate fibers. Preferred aluminosilicate fibers are commercially available under the trade designations "NEXTEL 550" and "NEXTEL 720" from the 3M Company.

Suitable aluminoborosilicate fibers are described, for example, in U.S. Pat. No. 3,795,524 (Sowman), the disclosure of which is incorporated herein by reference. Preferably, the aluminoborosilicate fibers include, on a theoretical oxide basis, about 55% to about 75% by weight $Al_2O_3$, less than about 45% (preferably, less than about 44%) by weight $SiO_2$, and less than about 25% (preferably, about 5%) by weight $B_2O_3$, based on the total weight of the aluminoborosilicate fibers. Preferred aluminoborosilicate fibers are commercially available under the trade designations "NEXTEL 312" and "NEXTEL 440" from the 3M Company.

Methods for making suitable alumina fibers are known in the art and include the method disclosed, for example, in U.S. Pat. No. 4,954,462 (Wood et al.), the disclosure of which is incorporated herein by reference. Preferably, the alumina fibers include, on a theoretical oxide basis, greater than about 99% by weight $Al_2O_3$ and about 0.2–0.3% by weight $SiO_2$, based on the total weight of the alumina fibers. Preferred alumina fibers are commercially available under the trade designation "NEXTEL 610" from the 3M Company.

Examples of other suitable inorganic fibers include: quartz fibers, which also are a subset of ceramic oxide fibers and are commercially available, for example, under the trade designation "ASTROQUARTZ" from J. P. Stevens, Inc., of Slater, N.C.; glass fibers, such as magnesium aluminosilicate glass fibers, which are commercially available under the trade designation "S2-GLASS" from Owens-Corning Fiberglas Corp. of Granville, Ohio; silicon carbide fibers, which are commercially available, for example, under the trade designations "NICALON" from Nippon Carbon of Tokyo, Japan, or Dow Corning of Midland, Mich., and "TYRANNO" from Textron Specialty Materials of Lowell, Mass.; carbon (e.g., graphite) fibers, which are commercially available, for example, under the trade designation "IM7" from Hercules Advanced Material Systems of Magna, Utah; silicon nitride fibers, which are available, for example, from Toren Energy International Corp. of New York, N.Y.; and metal fibers, such as stainless steel fibers, which are commercially available, for example, under the trade designation "BEKINOX" from Bekaert of Zweregan, Belgium.

Preferably, the individual fibers have a diameter(s) in a range of about 3 micrometers to about 50 micrometers, and more preferably, in a range of about 5 micrometers to about 25 micrometers. Fibers having diameters less than about 3 micrometers may be useful in the nonwoven fabric used in the mats according to the present invention, but they tend to be avoided as they are thought to be too friable. Fibers having diameters greater than about 50 micrometers are useful in the nonwoven fabric used in the mats according to the present invention, but they tend to have lower flexibility than mats made with smaller diameter fibers.

Typically, continuous fibers are treated with organic sizing materials (e.g., polyvinyl alcohol, polyvinyl pyrrolidone, or light hydrocarbon oils) during their manufacture. Although the fibers used to prepare the nonwoven fabric described herein can be sized (i.e., treated with organic sizing material, also referred to as "sizing") or unsized (i.e., essentially free of a sizing material), most commercially available continuous fibers are coated with a sizing material. Thus, the fibers used to prepare the nonwoven fabric described herein typically are coated with a sizing material. It is believed that the organic sizing materials tend to reduce breakage of fibers and reduce static electricity. Therefore, the presence of sizing tends to be preferred when making the nonwoven fabric. If solvents, such as water, are used during the processing, the sizing tends to dissolve away, however. Also, the sizing can be removed by burning it away.

In addition to the inorganic fibers, it is often desirable for the nonwoven fabric to further include an organic binder to aid in holding the inorganic fibers together, particularly during processing. The organic binder facilitates both the formation of the nonwoven fabric and the formation of the flexible mat according to the present invention. The organic binder typically is fugitive so it may be removed by heat treatment or may be dissolved away. Preferably, the nonwoven fabric includes at least about 2% by weight binder, and more preferably, at least about 2% binder and no greater than about 25% by weight binder, based on the total weight of the finished nonwoven fabric (including binder and other optional additives). Thus, preferably, the nonwoven fabric includes at least about 75% by weight inorganic fibers, and more preferably, at least about 75% and no greater than about 98% by weight inorganic fibers, based on the total weight of the finished nonwoven fabric (including binder and other optional additives). These values are appropriate for a mat that has not been subjected to heat treatment to remove the organics (e.g., binder, sizing material, etc.), which is often desirable before installation of the mat. Such heat treatment processes are typically carried out at a temperature of at least about 500° C. for at least about 10 minutes.

Suitable binder materials include organic polymers (e.g., polyethylene, polypropylene, polyester, nylon, rayon, water soluble polymers such as polyvinyl alcohol (PVA), and combinations thereof) that may initially be in a variety of forms, including resins, fibers, powders, films, or webs. If the binder is in the form of a powder or fibers, they may be incorporated into the fabric, for example, by combining the binder material with the inorganic fibers as they are processed and made into a nonwoven fabric. Alternatively, if the binder is in the form of a film or a web, the fabric can be laid, for example, onto or sandwiched with the binder. If the binder is a water-soluble material (e.g., PVA), it can be incorporated, for example, into the flexible nonwoven fabric by soaking or spraying the fabric with an aqueous solution of the material.

Preferred binder materials are in the form of fibers, which upon melting or dissolution tend to increase the integrity of the fabric, particularly as it is being handled during processing. A preferred binder material is a thermal bonding fiber (i.e., a fiber capable of bonding upon heat treatment), which processes readily through air-laying equipment and binds the fibers together with a relatively small amount of heat input. A suitable thermal bonding fiber is a thermoplastic fiber comprised of polyethylene and polyester, commercially available as "Type HC 105" fiber from Hoechst-Celanese of Greenville, S.C. Another preferred binder material is a water-soluble fiber (e.g., PVA fiber), which is suitable for use in fabric manufacturing methods that involve water. Thus, once the nonwoven fabric is prepared, the binder fibers are typically no longer discrete fibers.

The nonwoven fabrics used in preparing mats according to the resent invention can be produced in a wide range of thicknesses, as long as they are suitably flexible. Preferably, the nonwoven fabrics range in thickness from about 0.1 millimeter to about 5 millimeters, and more preferably, in a range of about 0.5 millimeter to about 2 millimeters. Although the fabric thicknesses correspond roughly to weight per unit area; for accuracy and consistency, fabric area weights are reported in the examples rather than fabric thicknesses. Preferably, the nonwoven fabrics used to make the mats according to the present invention have unit area weights ranging from about 40 grams/meter$^2$ to about 300 grams/meter$^2$. More preferably, the nonwoven fabrics have unit area weights ranging from about 50 grams/meter$^2$ to about 150 grams/meter$^2$. The desired fabric thickness and area weight ultimately is selected depending upon its application.

The nonwoven fabrics can be made by a variety of methods, as is known in the art. Preferably, they are made by a "wet-lay" method, which is similar to the method used in paper making, or by an "air-lay" method. In a wet-lay method, fibers are mixed with a liquid medium (preferably, water) and other additives (such as surfactants, dispersants, binders, and anti-flocculants) under high shear conditions. The resulting slurry of fibers is deposited onto a screen, where the liquid medium is drained away to produce a fabric. In an air-lay method, individualized fibers are fed into a web forming machine, which transports the fibers by means of an air stream onto a screen, to produce a nonwoven fabric. Such processes are well known in the art of nonwoven fabric manufacture.

In a typical wet-lay method, binder material such as thermoplastic fibers (e.g., PVA fibers) are blended at high shear in water. Inorganic fibers (chopped fibers and/or staple fibers) are added to the blender. High shear mixing typically causes at least some fibers to break, resulting in an overall reduction of fiber length. Mixing is carried out for a time sufficient to suspend the fibers in the water. Flocculating agent, such as an aqueous polyacrylamide solution, which is commercially available under the trade designation "NALCO 7530" from Nalco Chemical Co. of Napierville, Ill., can optionally be added during the mixing step to cause coagulation of the fibers if so desired. This aqueous fiber "slush" is then typically cast onto a screen (e.g., a papermaker) and drained to remove the water. The resultant nonwoven fabric is pressed with blotter paper to remove as much water as possible, and then dried in an oven to further remove the water (typically, at about 100° C.). The nonwoven fabric is then ready for further processing to form a mat.

In a typical air-lay method, inorganic fibers (chopped fibers and/or staple fibers) are mixed with a binder material, particularly thermoplastic fibers, in a fiber feeder, such as that commercially available as a "CMC EVEN FEED" from Greenville Machine Corp. of Greenville, S.C., to form a feed mat. The feed mat is fed into a rotating brush roll which breaks the feed mat up into individual fibers. The individual fibers are then transported through a blower to a conventional web forming machine, such as that commercially available under the trade designation "DAN WEB" from Scan Web Co. of Denmark, wherein the fibers are drawn onto a wire screen. While still on a screen, the fabric is moved through an oven and heated to temperatures ranging from about 120° C. to about 150° C. for about 1 minute to melt the thermoplastic fibers and bond the fibers of the fabric together. Optionally, or alternatively, the nonwoven fabric can be compressed and heated by passing through laminating rollers, for example, to melt the thermoplastic fibers. The nonwoven fabric is then ready for further processing into a mat.

To produce a mat according to the present invention, a metal oxide source is deposited on a nonwoven fabric. The metal oxide source can include, for example, a dispersion (i.e., a suspension) of a colloidal metal oxide, which may also include soluble metal oxides, and/or a solution of a metal oxide precursor. Alternatively, the metal oxide source does not require use of a liquid medium. That is, the metal oxide could be deposited on the fabric in a pattern through a mask, for example, using sputtering or powder coating. Preferably, the metal oxide is deposited from a metal oxide source having a liquid medium (e.g., an aqueous dispersion or solution), and more preferably from a dispersion of colloidal metal oxide.

As used herein, the term "metal" includes metalloids, such as silicon. Precursors of metal oxides include solutions of metal salts, which may be converted by heat in an oxygen atmosphere to a metal oxide, and often a colloidal metal oxide. For example, a nitrate salt of aluminum ($Al(NO_3)_3$) can be a precursor to colloidal alumina. Colloidal metal oxides are particles of metal oxide having one or more of its dimensions between 1 nanometer and 1 micrometer. Such colloidal metal oxides include, but are not limited to, alumina, zirconia, titania, silica, ceria colloids, and mixtures of these colloids. Colloidal silica is particularly preferred. A colloidal silica suitable for practice of this invention is commercially available under the trade designation "NALCO 2327" from Nalco Chemical Co. of Napierville, Ill.

Preferably, the metal oxide source is deposited by a screen printing process. A hand screen printer, or a rotoscreen printer, such as that commercially available under the trade designation "TYPE RMR-LAB 83" from Johannes Zimmers of Klagenfurt, Austria, is suitable for preparing flexible mats according to the present invention. The pattern and printing speed can be altered depending on the desired characteristics of the mat.

Typically, commercially available colloidal metal oxide dispersions and/or solutions of a metal oxide precursor have viscosities that are lower than desired for a screen printing process. To increase the viscosity of such dispersions or solutions, various thickening agents, such as methylcellulose or polyvinyl alcohol, can be added. A preferred thickening agent is polyvinyl alcohol (PVA), which is commercially available under the trade designation "CARBOPOL 934" from B. F. Goodrich of Cleveland, Ohio.

Typically, the source of metal oxide (preferably, a colloidal metal oxide dispersion) is printed onto only a portion of at least one major surface of the nonwoven fabric, although both major surfaces can each have only a portion coated with metal oxide. In particularly preferred embodiments, the source of metal oxide is printed onto at least one major surface of the fabric as a plurality of islands (i.e., discontinuous regions of coating surrounded by regions without any coating).

Typically, the metal oxide coating will at least partially penetrate into the thickness of the nonwoven fabric (while still remaining in discrete regions), although if the amount of coating is small enough it may remain substantially at the surface of the fabric. At least some penetration by the metal oxide into the fabric is desirable because the penetration is believed to produce enhanced tensile strength for the mat. For certain applications, the metal oxide coating may penetrate through the entire thickness of the coating to the other major surface (while still remaining in discrete regions).

After depositing the source of metal oxide on the nonwoven fabric, it is typically dried in air for a time sufficient to remove volatile materials, if they are present. The mat is then useful for a variety of applications, particularly if the source of metal oxide is a colloidal metal oxide. The removal of organic materials (e.g., sizing or organic binder) is not necessary for many applications. Typically, however, the mat is heat treated at a temperature and for a time sufficient to remove substantially all the organic materials present in the mat (e.g., the organic binder). This heat treatment step is typically carried out at a temperature of at least about 500° C. for at least about 10 minutes. This heating step can also serve to at least partially convert metal oxide precursors, if used, to the corresponding metal oxide. Preferably, however, the mat is heat treated at a temperature and for a time sufficient to convert all of the metal oxide precursor to a metal oxide. At elevated temperatures, colloidal metal oxide can also be converted to the corresponding ceramic metal oxide, although this is not a requirement. Thus, the term "metal oxide" refers, for example, to colloidal metal oxide, metal oxide gels, and ceramic metal oxide. The heat treated mat is then ready for use for a wider variety of applications (e.g., those in which organic components are undesirable). At this point, the mat includes fabric coated with a metal oxide and substantially no organic material. In this form, it is especially suitable for high temperature applications.

For some applications, such as in catalytic converters or other devices for burning gases or gas by-products, it may be desirable to use a catalyst with the mat. Catalysts can be coated onto the mat or incorporated into the mat by a variety of methods known to one of skill in the art. Such catalysts include conventional catalysts such as metals (e.g., ruthenium, osmium, rhodium, iridium, nickel, palladium, and platinum) and metal oxides (e.g, vanadium pentoxide and titanium dioxide).

The flexible mats according to the present invention are useful, for example, for high temperature insulation and electrical insulation (e.g., as a battery separator). They are also useful as a flame barrier, as a heat shield for aerospace applications, as a catalyst support, and as filter media. The flexible mats could be used in product identification systems, wherein a desired printed pattern is used to mark a product. The mats could also be used as reinforcement in a ceramic or a metal matrices. Such composite materials would be useful as, for example, a gas burner nozzle liner, a radiant burner, a heat exchanger, a thermowell, a core buster or flame disperser, or other gas-fired furnace components.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Preparation of Nonwoven Fabrics

Nonwoven fabrics were prepared by one of the following methods.

Wet-Lay Method I

About 2.5 liters of water were added to the container of a conventional laboratory blender, obtained from Waring Products Division, Dynamics Corporation of America, New Hartford, Conn., under the trade designation "WARING." Of the total fiber weight, about 5% consisted of thermoplastic fibers (polyvinyl alcohol (PVA) fibers, 0.32 cm long, obtained from Kuraray Co., Ltd., Osaka, Japan, under the trade designation "KURALON" Type VPB 105). These were added to the blender and mixed for 10 seconds on the lowest speed setting.

The remaining 95% of the fiber weight consisted of ceramic oxide fibers. If the ceramic oxide fibers included refractory ceramic fibers ("staple" fibers), the ceramic oxide fibers were added in two portions, as follows. The refractory ceramic fibers were mixed in for 20 seconds to reduce the fiber lengths to less than about 3 millimeters. The second portion of fibers, having lengths as specified in the examples below, were added to the blender and mixed for about 2 seconds.

This mixture of thermoplastic fibers and inorganic fibers was transferred to a large beaker and mixed with an air mixer at high speed (about 500 revolutions per minute) for about 60 seconds. During this mixing step, about 1 gram of flocculating agent (polyacrylamide solution, obtained from Nalco Chemical Co., Napierville, Ill., under the trade designation "NALCO 7530") was added.

The resulting mixture was transferred to a 20.3-centimeter by 20.3-centimeter lab-scale papermaker, obtained from Williams Apparatus Co., Watertown, N.Y., under the trade designation "HANDSHEET MAKER," and drained to remove the water. The resultant fibrous mass was pressed with blotter paper by hand to remove as much water as possible, and then transferred to a lab oven and dried for 60 minutes at 100° C. The nonwoven fabric typically ranged in thickness from about 5 millimeters to about 1 millimeter and ranged in weight per unit area from about 50 grams/meter$^2$ to about 250 grams/meter$^2$.

Wet-Lay Method II

This method was the same as that described in Method I, except that all the inorganic fibers used to make the nonwoven fabric were at least 0.5 centimeter in length (no RCF were used). Also, these fibers were added all at once to the blender and mixed for about 2 seconds.

Air-Lay Method

To make a nonwoven fabric by air laying, both thermoplastic fibers and inorganic fibers were used. Of the total fiber weight, about 25% were thermoplastic fibers (1.25 centimeters long, 3 denier), obtained from Hoechst Celanese, Greenville, S.C., under the trade designation "TYPE HC 105." These fibers were used as received.

If continuous fibers were used, they were initially chopped using a glass roving cutter, obtained from Finn & Fram, Inc., Pacoima, Calif., under the trade designation "MODEL 90 GLASS ROVING CUTTER," to the desired length. The chopped fibers were then separated or individualized by passing them through a waste pulling machine, obtained from LaRoche, Cours, France, under the trade designation "CADETTE 500."

The chopped individualized fibers or staple fibers were passed twice through a fiber feeder, obtained from Greenville Machine Corp., Greenville, S.C., under the trade designation "CMC EVEN FEED" to form a feed mat. The feed mat was fed into a rotating brush roll, which broke the feed mat up into individual fibers. The individual fibers were then transported through a blower to a conventional web forming machine, obtained from Scan Web Co., Denmark, under the trade designation "DAN WEB," wherein the fibers were drawn onto a wire screen.

The mat was moved into an oven (while on a wire screen) and heated to 138° C. for about 1 minute to melt the thermoplastic fibers and bond the fibers together. The weight per unit area of the mats ranged from about 40 grams/meter$^2$ to about 300 grams/meter$^2$.

Preparation of Mats

The nonwoven fabric was prepared for screen printing by cutting them into pieces 20.3 centimeters square. They were coated with colloidal metal oxide in a desired pattern by screen printing using a colloidal metal oxide dispersion. The colloidal metal oxide dispersion used was a PVA-thickened colloidal silica mixture. This mixture contained colloidal silica, obtained from Nalco Chemical Co., Napierville, Ill., under the trade designation "NALCO 2327," and PVA, obtained from B. F. Goodrich, Akron, Ohio, under the trade designation "CARBOPOL 934." The amount of PVA used was about 0.5% to about 0.75% by weight, based on weight of the colloidal silica dispersion.

Each sample was printed using conventional screen printing techniques wherein a desired pattern was selected and the thickened colloidal metal oxide dispersion was passed through a screen, thus depositing the desired pattern on the nonwoven fabric. The samples described below were printed with a rotoscreen printer, obtained from Johannes Zimmers, Klagenfurt, Austria, under the trade designation "TYPE RMR-LAB 83." The printing speed was approximately 4.57 meters/minute.

After printing, the mat was dried in air for about 3 hours, cut to size, and then heated in an oven at 600° C. for 15 minutes (unless otherwise noted) to remove organics. The amount of dry metal oxide coating on the mat, in grams, is reported below. The colloidal dispersion remained in discrete regions on the surface of, and/or throughout, the nonwoven fabric.

Pattern 1 was a series of discrete 1.6-millimeter diameter dots spaced 4.8 millimeters center to center in a row and 3.2 millimeters apart on the diagonal. This pattern is similar to that depicted in FIG. 2. The estimated surface area coverage of this pattern ranged from about 16% to about 25%.

Pattern 2 was a series of discrete 7-millimeter crosses having segments that were 1.5 millimeters wide. The crosses were arranged in a 45 degree diagonal pattern spaced 9 millimeters apart as measured center to center. This pattern is similar to that depicted in FIG. 1. The estimated surface area coverage of this pattern ranged from about 15% to about 20%.

Pattern 3 was a series of discrete 0.8-millimeter diameter dots spaced 2.5 millimeters center to center in a row and 2 millimeters apart on the diagonal. This pattern is similar to that depicted in FIG. 2. The estimated surface area coverage of this pattern ranged from about 8% to about 12%.

For Comparative Examples, either no screen printing was done, or the mat was sprayed (using a hand held pump sprayer) with colloidal silica dispersion (obtained from Nalco Chemical Co., Napierville, Ill., under the trade designation "NALCO 2327") over its entire surface. Drying and heating of the sprayed mats was as described for the printed samples.

Test Methods

Flexibility Test

A piece (5.1 centimeters wide by 15.2 centimeters long) of mat was wrapped once around the circumference of a 6.3-millimeter diameter rod (approximately the diameter of a pencil). A mat passed this test if it could be wrapped around this rod and unwrapped without cracking or breaking to such an extent that it did not fall apart, split apart, or disintegrate into smaller portions and/or individual fibers. Mats were further tested only if they passed this test. Most mats were tested after they had been heat treated, typically at 600° C. for 15 minutes, although harsher conditions were also used.

Flame Test

For this test, a piece 2.5 centimeters wide by 15.2 centimeters long was used. The ends of this sample of mat were held in place between two ceramic bricks so that about 10 centimeters of the mat was suspended between the ceramic bricks. A 50-gram weight was placed on top of the mat. A flame using a Bunsen burner was positioned beneath the mat so that the tip of the flame contacted that portion of the mat under the weight. The flame test duration was 30 seconds. If the mat held the weight for the 30 seconds while subjected to the flame, it passed this test. If the mat broke, it failed this test. A typical failure occurred within a few seconds of exposure to the flame.

Two types of Comparative Examples were carried out using the Flame Test. In the first, the mat was compared to nonwoven fabric with no coating on it; in the second, the mat was compared to mats produced using 100% "staple" fibers (RCF).

Strength Test

The samples (2.5 centimeters by 15.2 centimeters) were tested for their strength using a tensile tester, obtained from Instron Corp., Canton, Mass., under the trade designation "INSTRON" Model #1130. The cross head speed was 1.27 centimeter/minute and jaw gap was 5 centimeters. Results of the strength test are reported in kilograms.

Examples 1–4

Examples 1–4 show the strength and flexibility of mats having low area weights (i.e., about 50 grams/meter$^2$). The mats contained 5% of thermoplastic fibers, and 95% of inorganic fibers. Example 1 contained aluminosilicate fibers (0.63 centimeter long) obtained from the 3M Company, under the trade designation "NEXTEL 440"; Example 2 contained aluminoborosilicate fibers (0.32 centimeter long) obtained from the 3M Company, under the trade designation "NEXTEL 312"; Example 3 contained glass fibers (0.63 centimeter long), obtained from Owens Corning Fiberglas Corp. of Granille, Ohio under the trade designation "S-2 GLASS"; Example 4 contained 50% staple refractory ceramic fibers, obtained from Unifrax, Niagara Falls, N.Y., under the trade designation "7000M," and 50% aluminosilicate fibers, (0.63 centimeter long), obtained from the 3M Company under the trade designation "NEXTEL 440." The nonwoven fabrics for Examples 1–3 were made by "Wet-Lay Method II." The nonwoven fabric for Example 4 was made by "Wet-Lay Method I." The area weights for the nonwoven fabrics are listed in Table 1, below.

For each example, the mats were prepared according to the method for preparation of the mats described above using "Print Pattern 1." The dried coating weights of the metal oxide coating are listed in Table 1 also. The samples were tested according to the "Flexibility Test," "Flame Test," and "Strength Test." Test results are shown in Table 1 also.

TABLE 1

| Example No. | Area Weight (g/m$^2$) | Coating Weight (g) | Strength (kg) | Flexibility Test | Flame Test |
|---|---|---|---|---|---|
| 1 | 50 | 0.64 | 0.24 | passed | passed |
| 2 | 50 | 0.75 | 0.11 | passed | passed |
| 3 | 50 | 0.81 | 0.29 | passed | passed |
| 4 | 50 | 0.93 | 0.41 | passed | passed |

Comparative Example A

Staple refractory ceramic fiber (RCF), obtained from Unifrax of Niagara Falls, NY, under the trade designation "7000M," was processed according to "Wet-Lay Method I." The nonwoven fabric had a weight per unit area of 50 grams/meter$^2$. The mat was prepared according to the method for "Preparation of Mats" described above using "Print Pattern 1." This mat failed both the "Flexibility Test" and the "Flame Test."

Example 5

This example describes a nonwoven mat made with staple fibers (RCF) in combination with 1.25-centimeter long ceramic oxide fibers. The fabric contained 5% of thermoplastic fibers and 95% of inorganic fibers, which were a mixture of 50% staple refractory ceramic fiber, obtained from Unifrax of Niagara Falls, N.Y., under the trade designation "7000M," and 50% aluminosilicate fiber (1.25 centimeters long), obtained from the 3M Company under the trade designation "NEXTEL 440." The fabric was made according to "Wet-Lay Method I." The fabric area weight was 53 grams/meter$^2$. The mat was prepared according to method for "Preparation of Mats" described above using "Print Pattern 3." The dried coating weight on the mat was 0.93 gram. This mat passed the "Flexibility Test" and the "Flame Test."

Examples 6–14

These examples illustrate the effect of mat density on the strength of the mat using the same type and length of fiber. The nonwoven fabrics were prepared by Wet-Lay Method II. The inorganic fiber was aluminosilicate fiber (0.63 centimeter long), obtained from the 3M Company under the trade designation "NEXTEL 440." For each example, the mats were prepared according to the method for "Preparation of Mats" described above using "Print Pattern 1." The area weight of the nonwoven fabric, the "Flexibility Test" and "Flame Test" results, and the dried metal oxide coating weight are listed in Table 2, below.

TABLE 2

| Example No. | Area Weight (g/m$^2$) | Coating Weight (g) | Strength (kg) | Flexibility Test | Flame Test |
|---|---|---|---|---|---|
| 6 | 50 | 0.76 | 0.23 | passed | passed |
| 7 | 75 | 0.98 | 0.32 | passed | passed |
| 8 | 100 | 1.01 | 0.66 | passed | passed |
| 9 | 125 | 1.08 | 0.21 | passed | * |
| 10 | 150 | 1.05 | 0.11 | passed | * |
| 11 | 175 | 1.17 | 0.20 | passed | * |
| 12 | 200 | 1.45 | 0.18 | passed | * |
| 13 | 225 | 1.08 | 0.10 | passed | * |
| 14 | 250 | 1.05 | 0.23 | passed | * |

* did not test

Comparative Example B

This example was prepared as described for Example 7 except that no colloidal metal oxide was deposited onto the nonwoven fabric. This mat failed the "Flexibility Test."

Comparative Example C

This example illustrates the effect of using 100% short fibers in the nonwoven fabric. Ceramic paper (250 grams/meter$^2$, approximately 0.16 centimeter thick), obtained from Unifrax, Niagara Falls, N.Y., under the trade designation "FIBERFRAX" Type 970, was cut into a piece 20.3 centimeters square. This was printed with "Print Pattern 1" using the thickened colloidal metal oxide dispersion as described above in the method for "Preparation of Mats." The dried coating weight deposited onto this paper was 0.65 gram. This paper is believed to have a high organic content which significantly reduced penetration of the metal oxide source into the paper. The printed paper was heat treated before the "Flexibility Tes" was performed by heating for 10 minutes at 750° C. This heat treatment served to remove substantially all the organic matter from the paper. This sample failed the "Flexibility Test."

Comparative Example D

This example illustrates a mat having a uniform spray coating of colloidal metal oxide on the entire surface of the nonwoven fabric. A nonwoven fabric was prepared by "Wet-Lay Method I," which had about 5% by weight PVA fiber, obtained from Kuraray Co., Ltd., Osaka, JP under the trade designation "KURALON" Type VPB 105, and 95% aluminosilicate fiber (0.63 centimeters long), obtained from the 3M Company under the trade designation "NEXTEL 440." The fabric had an area weight of about 54 grams/meter$^2$. Pieces 20.3 centimeters square were cut from this fabric. A piece was sprayed with a colloidal silica, obtained from Nalco Chemical Co., Napierville, Ill., under the trade designation "NALCO 2327," using a hand pump spray bottle. The entire sample surface was coated with the colloidal silica. The coating weight was about 1.08 grams. The mat was heat treated before the "Flexibility Test" was performed by heating for 10 minutes at 750° C. This mat failed the "Flexibility Test," as it was stiff, brittle, and cracked apart upon the first flexure.

Examples 15–17

The nonwoven fabrics of these examples contained 5% thermoplastic fiber and 95% of inorganic fibers, which was a mixture of 50% staple refractory ceramic fibers, obtained from Nippon Steel Chemical Co., Tokyo, Japan, under the trade designation "SNSC" Type 1260 D1 RCF, and 50% aluminosilicate fiber (2.5 centimeters long), obtained from the 3M Company under the trade designation "NEXTEL 440." The fabric for each example was made according to the "Air-Lay Method." The fabric area weight was 43 grams/meter$^2$ for the fabric of each of Examples 15 and 16, and 178 grams/meter$^2$ for the Example 17 fabric. Each of the mats of Examples 15–17 were prepared according to the method for "Preparation of Mats" described above. The fabric of Example 15 was printed with "Print Pattern 3" on one side of the fabric at a coating weight of 1.3 grams. The fabric of Example 16 was printed with "Print Pattern 1" on one side of the fabric at a coating weight of 1.1 grams. The fabric of Example 17 was printed with "Print Pattern 1" on both sides of the fabric at a coating weight of 1.6 grams. Each of the mats of Examples 15–17 passed both the "Flexibility Test" and the "Flame Test."

Comparative Examples E and F

The following comparative examples illustrate the results of using 100% short fibers (i.e., all no longer than about 1 millimeter) to prepare the nonwoven fabric. The fabrics were prepared by the "Air-Lay Method," using refractory ceramic fiber. Comparative Example E used staple refractory ceramic fibers, obtained from Unifrax of Niagara Falls, N.Y., under the trade designation "7000M." Comparative Example F used staple refractory ceramic fibers, obtained from Nippon Steel Chemical Co., Tokyo, Japan, under the trade designation "SNSC" Type 1260 D1 RCF. The nonwoven fabrics made from these fibers had an area weight of 225 grams/meter$^2$. Each of the mats of Comparative Examples E and F were prepared according to the method for "Preparation of Mats" described above using "Print Pattern 1." The printed mat of Comparative Example E had a tensile strength of 0.0181 kg and that of Comparative Example F had a tensile strength of 0.0227 kg. The printed mats of both examples failed the "Flexibility Test."

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A flexible mat comprising:
   (a) a nonwoven fabric having first and second major surfaces; and
   (b) a metal oxide coating on only a portion of at least one of the major surfaces;
   wherein:
      (i) the fabric includes an amount of inorganic fibers at least about 5 millimeters in length, and
      (ii) the mat includes an amount and arrangement of the metal oxide coating,
      both of which are sufficient to retain the integrity of the mat when it is wrapped once around a 6 millimeter diameter rod and then unwrapped.

2. The flexible mat according to claim 1 which retains its integrity, after exposure to a temperature of 500° C. for 10 minutes and then cooled to 25° C., when it is subsequently wrapped once around a 6 millimeter diameter rod and then unwrapped.

3. The flexible mat according to claim 1 which is capable of supporting a 50-gram weight when exposed to a Bunsen burner flame for 30 seconds.

4. The flexible mat according to claim 1 wherein at least about 10% by weight of the inorganic fibers are at least about 5 millimeters in length.

5. The flexible mat according to claim 4 wherein at least about 10% by weight of the inorganic fibers are at least about 1 centimeter in length.

6. The flexible mat according to claim 1 wherein the metal oxide is a colloidal metal oxide.

7. The flexible mat according to claim 6 wherein the colloidal metal oxide is selected from the group consisting of colloidal silica, colloidal alumina, colloidal zirconia, colloidal titania, colloidal ceria, and combinations thereof.

8. The flexible mat according to claim 7 wherein the colloidal metal oxide is colloidal silica.

9. The flexible mat according to claim 1 wherein the metal oxide is arranged in a plurality of islands on the first major surface.

10. The flexible mat according to claim 9 wherein the plurality of islands form a repeating pattern on the first major surface.

11. The flexible mat according to claim 10 wherein the plurality of islands have a total surface area of about 5% to about 25%, based on the total surface area of the major surface having the metal oxide coating thereon.

12. The flexible mat according to claim 1 wherein the nonwoven fabric has a weight per unit area of about 40 grams/meter$^2$ to about 300 grams/meter$^2$.

13. The flexible mat according to claim 1 wherein the inorganic fibers are selected from the group consisting of glass fibers, ceramic oxide fibers, silicon nitride fibers, silicon carbide fibers, carbon fibers, and metal fibers.

14. The flexible mat according to claim 1 wherein the nonwoven fabric has a metal oxide coating on only a portion of each of the first and second major surfaces.

15. A flexible mat comprising:
   (a) a nonwoven fabric having an organic binder therein, and first and second major surfaces; and
   (b) a metal oxide coating on only a portion of at least one of the major surfaces;
   wherein:
      (i) the fabric includes an amount of inorganic fibers at least about 5 millimeters in length, and
      (ii) the mat includes an amount and arrangement of the metal oxide coating,
      both of which are sufficient to retain the integrity of the mat when it is wrapped once around a 6 millimeter diameter rod and then unwrapped.

16. A flexible mat comprising:
   (a) a nonwoven fabric comprising inorganic fibers and having first and second major surfaces, wherein at least about 10% by weight of the inorganic fibers are at least about 5 millimeters in length; and
   (b) a metal oxide coating on at least one of the major surfaces, the coating covering about 5% to about 25% of the total surface area of the major surface having the metal oxide coating thereon;
   wherein the mat retains its integrity when it is wrapped once around a 6 millimeter diameter rod and then unwrapped.

17. The flexible mat according to claim 16 which retains its integrity, after exposure to a temperature of 500° C. for 10 minutes and then cooled to 25° C., when it is subsequently wrapped once around a 6 millimeter diameter rod and then unwrapped.

18. The flexible mat according to claim 16 wherein the metal oxide is a colloidal metal oxide.

19. The flexible mat according to claim 18 wherein the metal oxide is arranged in a plurality of islands on the first major surface.

20. The flexible mat according to claim 19 wherein the plurality of islands form a repeating pattern on the first major surface.

21. The flexible mat according to claim 16 wherein the nonwoven fabric further includes an organic binder.

22. The flexible mat according to claim 21 wherein the organic binder is present in an amount of about 2% to about 25% by weight, based on the total weight of the finished nonwoven fabric.

23. The flexible mat according to claim 22 wherein the organic binder is selected from the group consisting of polyvinyl alcohol, polyethylene, polypropylene, polyester, nylon, rayon, and combinations thereof.

24. A method of making a flexible mat, the method comprising:

(a) providing a nonwoven fabric having first and second major surfaces; and (b) depositing a metal oxide source on the nonwoven fabric to provide a metal oxide coating on only a portion of at least one of the major surfaces;

wherein:

(i) the fabric includes an amount of inorganic fibers at least about 5 millimeters in length, and (ii) the mat includes an amount and arrangement of the metal oxide coating, both of which are sufficient to retain the integrity of the mat when it is wrapped once around a 6 millimeter diameter rod and then unwrapped.

25. The method according to claim 24 wherein the mat retains its integrity, after exposure to a temperature of 500° C. for 10 minutes and then cooled to 25° C., when it is subsequently wrapped once around a 6 millimeter diameter rod and then unwrapped.

26. The method according to claim 24 wherein the step of depositing comprises a step of screen printing the metal oxide source on the nonwoven fabric.

27. The method according to claim 24 wherein the metal oxide source comprises a dispersion of a colloidal metal oxide.

28. The method according to claim 24 wherein the nonwoven fabric further comprises an organic binder.

29. The method according to claim 28 further including a step of heat treating the mat after the step of depositing a metal oxide source.

30. The method according to claim 29 wherein the heat treating step is carried out for a time and at a temperature sufficient to remove substantially all the organic binder.

31. The method according to claim 24 wherein the metal oxide source comprises a solution of a metal oxide precursor.

32. The method according to claim 31 wherein the step of depositing includes a step of heat treating the mat to convert at least a portion of the metal oxide precursor to a metal oxide.

33. The method according to claim 32 wherein the heat treating step is carried out for a time and at a temperature sufficient to convert all of the metal oxide precursor to a metal oxide.

34. The method according to claim 33 wherein the metal oxide coating covers about 5% to about 25% of the total surface area of the major surface having the metal oxide coating thereon.

35. The method according to claim 33 wherein the mat retains its integrity, after exposure to a temperature of 500° C. for 10 minutes and then cooled to 25° C., when it is subsequently wrapped once around a 6 millimeter diameter rod and then unwrapped.

* * * * *

UNITED STATES PATENT AND TRADEMARK OFFICE
CERTIFICATE OF CORRECTION

PATENT NO.   : 5,955,177
DATED        : September 21, 1999
INVENTOR(S)  : Sanocki et al.

Page 1 of 1

It is certified that error appears in the above-identified patent and that said Letters Patent is hereby corrected as shown below:

Col. 4, Line 26, "I" should read —1—

Col. 5, Line 16, "yams" should read —yarns—

Col. 5, Line 19, "yam" should read —yarn—

Col. 5, Line 22, "yam" should read —yarn—

Col. 5, Line 25, "yam." should read —yarn.—

Col. 14, Line 44, "Tes" should read —Test—

Signed and Sealed this

Fifth Day of June, 2001

*Attest:*

*Attesting Officer*

NICHOLAS P. GODICI

*Acting Director of the United States Patent and Trademark Office*